March 15, 1927.

C. T. PFLUEGER

FROG SPEAR

Filed Aug. 24, 1922

1,621,082

Inventor.
Charles T. Pflueger
By Brockett & Hyde
Attys.

Patented Mar. 15, 1927.

1,621,082

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

FROG SPEAR.

Application filed August 24, 1922. Serial No. 584,030.

This invention relates to improvements in frog or fish spears.

The object of this invention is to provide an improved spear of the kind described in which maximum strength is obtained in the mounting of the tines in the ferrule; more particularly to provide a spear in which the tines are secured within the end portion of the ferrule by welding; and furthermore to secure the end portions of the tines within the ferrule by welding the same and as part of the same operation to cause the body of the ferrule to be depressed into the body of the tines, thereby forming what might be termed an interlocking engagement between the ferrule and the tines.

Further objects of the invention will appear from the following description and claim when considered together with the drawings.

Figure 1:
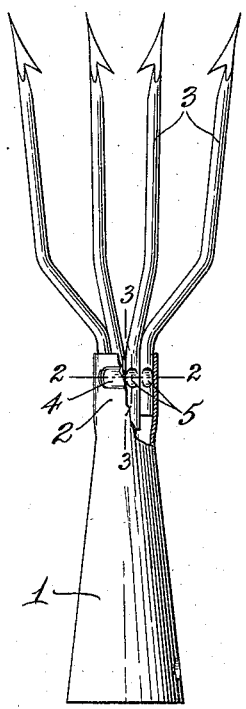
Figure 3:
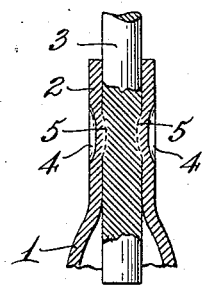
Figure 2:
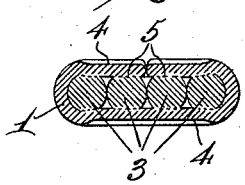

In the drawings, Fig. 1 is a side elevation, Fig. 2 is a cross sectional view on the line 2—2, Fig. 1; and Fig. 3 is a detail sectional view on the line 3—3, Fig. 1.

The ferrule 1 which is of tapered form and which is adapted to be secured upon the end of a rod or handle has its smaller end flattened, as indicated at 2, to receive the end portions of a number of tines 3. According to the present invention the ferrule and tines are secured together by welding; and as a part of the same operation both sides of the flattened portion of the ferrule and the tines are depressed at this point so as to form what might be termed an interlocking engagement to more firmly secure the tines against accidental removal from the ferrule. The depressions in the ferrule are shown at 4 and those in the tines are indicated at 5.

Thus it will be seen that I have obtained an extremely efficient means of securing the tines within the ferrule and in a comparatively simple manner of operation. Hence the usefulness of the device is prolonged and the expense of such a structure is comparatively small.

What I claim is:—

In an article of the class described, a plurality of tines divergently arranged in a common plane and having parallel contacting shank portions, a ferrule having a flattened socket portion receiving said tine shank portions, said tine shank portions being provided with aligned deformations, said ferrule socket portion being provided with a transversely extending deformation interlocking with said shank deformations, and said tines and said ferrule being joined at said interlock, as by welding, whereby said tines are permanently secured in said described arrangement.

In testimony whereof I hereby affix my signature.

CHARLES T. PFLUEGER.